UNITED STATES PATENT OFFICE.

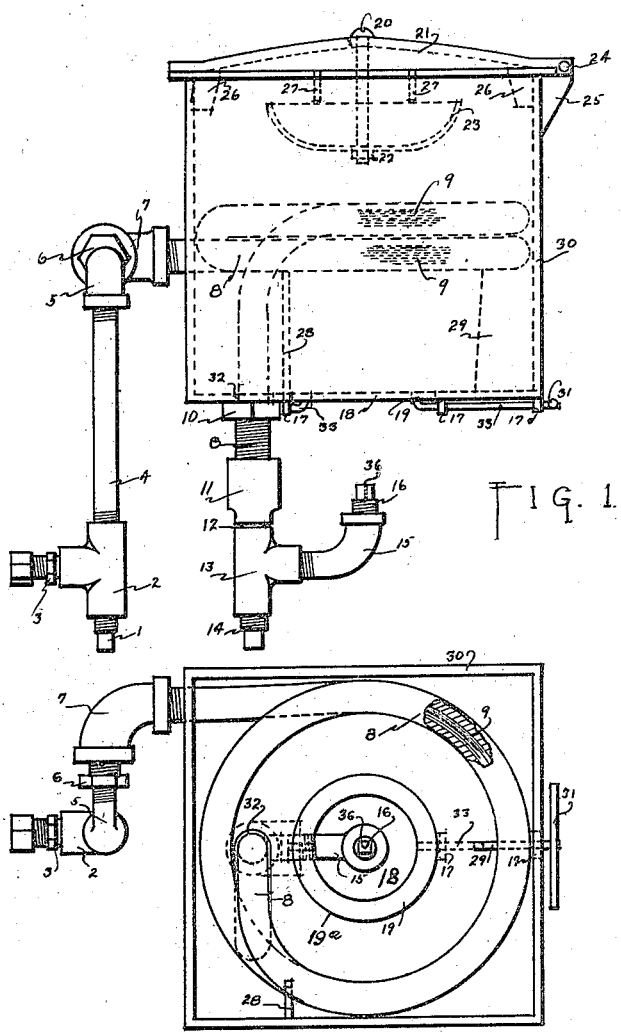

HARDY A. FRIEND, OF MARSHALLTOWN, IOWA.

LIQUID-HYDROCARBON BURNER.

1,240,130.  Specification of Letters Patent.  Patented Sept. 11, 1917.

Application filed April 27, 1917. Serial No. 164,964.

*To all whom it may concern:*

Be it known that I, HARDY A. FRIEND, a citizen of the United States, residing at Marshalltown, in the county of Marshall and State of Iowa, have invented new and useful Improvements in Liquid-Hydrocarbon Burners, of which the following is a specification.

This invention relates to improvements in liquid hydrocarbon burners the object of the invention being to provide an improved burner of this class which is simple in construction, may be readily manufactured at slight cost, which is adapted to burn kerosene, gasolene or other liquid hydrocarbon and which is adapted for use in cooking and heating stoves, furnaces, ranges and the like and at any place where heat is to be employed.

The invention consists in the construction, combination and arrangement of devices hereinafter described and claimed.

In the accompanying drawings:—

Figure 1 is a side elevation of a liquid hydrocarbon burner constructed and arranged in accordance with my invention.

Fig. 2 is a plan of the same with the cover or lid removed.

Fig. 3 is a detailed plan of the cover or lid.

In the embodiment of my invention I provide a drum or casing 30 which forms a mixing element and which is here shown as rectangular and as provided with a bottom which has a central circular opening 19ª. The drum or casing may be made of any suitable size and shape. At one side of the casing at the upper end thereof are lugs 25 which extend outwardly therefrom. A lid or cover 21 is provided to close the upper end of the casing and is provided at one side with lugs 24. A pintle rod extends through alined openings in the lugs 24, 25 and hence serves to pivotally mount the lid or cover on the casing so that the lid or cover can be raised when desired. On its under side the lid is provided with lugs 26, 27 which enter the upper end of the casing and serve to support the lid when the latter is closed. The lid is provided with openings 34, 35 of different sizes to permit the passage of flame upwardly through the lid as will be understood. A hanger bolt 20 depends from the center of the lid and to the lower end of said hanger bolt is secured a deflecting bell 23 by means of a nut 22 said deflecting bell when the lid is closed being arranged in the central upper portion of the drum, casing, or mixing element 30.

A tubular generating coil 8 is arranged horizontally in the casing 30 and bears on supporting lugs 28, 29 with which the interior of the casing is provided. Strands of wire 9 are arranged in the coils of the generator and serve to obstruct and retard without preventing the flow of liquid hydrocarbon through the generator coils. An elbow 7 is screwed to the intake arm of the generator coil, the said arm extending out through an opening in one wall of the casing. A reducer nipple 6 is screwed to said elbow and an elbow 5 is screwed in said reducer nipple. A vertically arranged pipe 4 is connected to the elbow 5 and at its lower end is also connected to a vertically arranged T 2 which has a screw plug 1 in its lower end. A fuel feeding pipe which leads from a suitable reservoir not shown is connected to the horizontal arm of the T 2 by the fitting 3.

A discharge arm of the generating coil extends downwardly and passes through an opening 32 in the bottom of the casing 30 and is provided with a nut 10 which bears against the bottom of the casing and co-acts with the lugs 28, 29 in firmly and yet detachably securing the generating coil in place in the casing. A reducer 11 is screwed to the lower end of the discharge arm of the generating coil and is connected to a T 13 which has a screw plug 14 in its lower end. An upwardly turned elbow 15 is connected to the horizontal arm of said T 13 and is provided at its upper end with a screw plug 16 which has a minute orifice 36 which is directed upwardly and is arranged below the center of the bottom of the casing.

A circular damper 19 is arranged to close in the opening 19ª in the bottom of the casing. Said damper has a central opening 18 and said damper is mounted on a rod 33 which is arranged in bearing openings in lugs 17 with which the bottom of the casing is provided. The said rod is provided at its outer end with a handle 31 to enable said rod to be readily manually turned and hence cause the damper to be arranged in either open or closed position as may be required. The damper regulates the admission of air to the interior of the mixing element or casing 30 as will be understood, a minimum quantity entering through the opening 18 when the damper is in closed position and a maximum quantity entering through the opening 19ª, when the damper is in open position.

In the operation of my improved burner the oil or other liquid hydrocarbon enters the burner at 3 and is carried up and into the coil 8. Said coil being hot serves to convert the liquid hydrocarbon into gas or vapor and the pressure within the coil forces the gas to the outlet jet plug 36. The gas is discharged upwardly from the jet plug through the casing 30 and strikes the bell 23 which is intensely heated and causes the mixture of gas and air to flash into a blue flame within the casing. It will be observed that the bell is only a slight distance above the coil and is arranged above the center thereof so that the bell by deflecting the flame causes the coil to become heated to the maximum extent. The flame extends up through the openings in the lid. If for any reason the flame should be blown out the mixture will be immediately thereafter caused to flash into flame by striking the heated bell so that the burner will continue to efficiently operate and will reignite the combustible mixture. The damper serves to regulate the quantity of air supplied to the burner and to permit the mixture of more or less air with the gas, according to the position in which the damper is arranged, as will be understood.

I would have it understood that my improved burner may be made of any size required and may be provided with any desired or suitable number of jet plugs or nozzles and I would also have it understood that changes may be made in the form, proportion and construction of the several parts without departing from the spirit of my invention and within the scope of the appended claims.

Having thus described my invention, I claim:—

1. In a burner of the class described, a casing forming a mixing element and provided with an air intake opening at one end, a closure at the opposite end of the casing and provided with openings, a gas generating or vaporizing coil arranged in said casing and provided with means to discharge gas or vapor into said casing through the first-named opening, and a flame spreading element in said casing arranged between said coil and said closure.

2. In a burner of the class described, a casing forming a mixing element and provided with an air intake opening at one end, a closure at the opposite end of the casing and provided with openings, a gas generating or vaporizing coil arranged in said casing and provided with means to discharge gas or vapor into said casing through the first-named opening, and a flame spreading element in said casing and connected to said closure and removable from the casing by and with the closure.

3. In a burner of the class described, a casing forming a mixing element and provided with an air intake opening at one end, a closure hinged thereto and provided with openings, a gas generating or vaporizing coil arranged in said casing and provided with means to discharge gas or vapor into said casing through the first-named opening, and a flame spreading element in said casing and connected to said closure and removable from the casing by and with the closure.

In testimony whereof I affix my signature.

HARDY A. FRIEND.

Copies of this patent may be obtained for five cents each, by addressing the "Commissioner of Patents, Washington, D. C."